July 29, 1958 N. G. KLING ET AL 2,845,062
RESPIRATOR PUMPING APPARATUS
Filed July 17, 1956 7 Sheets-Sheet 1

INVENTORS
Thomas C. Huxley III
BY Nelson G. Kling
Edwin Leveroh &
Harry Cole
ATTORNEYS July 29, 1958  N. G. KLING ET AL  2,845,062
RESPIRATOR PUMPING APPARATUS
Filed July 17, 1956  7 Sheets-Sheet 4

INVENTORS
Thomas C. Huxley III
BY Nelson G. Kling
ATTORNEYS

July 29, 1958  N. G. KLING ET AL  2,845,062
RESPIRATOR PUMPING APPARATUS
Filed July 17, 1956  7 Sheets-Sheet 6

INVENTORS
Thomas C. Huxley III
Nelson G. Kling
BY
ATTORNEYS

July 29, 1958  N. G. KLING ET AL  2,845,062
RESPIRATOR PUMPING APPARATUS
Filed July 17, 1956  7 Sheets-Sheet 7

INVENTORS
Thomas C. Huxley III
BY Nelson G. Kling
ATTORNEYS

United States Patent Office 2,845,062
Patented July 29, 1958

2,845,062

RESPIRATOR PUMPING APPARATUS

Nelson G. Kling, Roslyn, and Thomas C. Huxley III, Manhasset, N. Y., assignors to Conitech, Ltd., Chauncey, N. Y., a corporation of New York Application July 17, 1956, Serial No. 598,453

6 Claims. (Cl. 128—30)

The present invention relates to artificial respirators and to pumping apparatus therefor.

One object of the present invention is to provide a respirator pump which is operable in connection with respiration apparatus to cause the patient to breathe in a manner at least approximately similar to the manner of normal breathing, particularly in respect to the rate of inhalation in comparison with the rate of exhalation in a breathing cycle. More particularly, in accordance with this object of the invention the pump is operable in conjunction with the respirator apparatus to cause the patient to inhale more rapidly than he or she exhales.

Another object of the present invention is to provide a respirator pump which can be readily employed with respiration apparatus of different types and which in conjunction with respiration apparatus of one type or another is operable to accomplish the above stated object of the invention.

Another object of the invention is the provision of a respirator pump which is of such construction that it is operable in an effective and efficient manner for rhythmically varying the air pressure either in a respirator of the type according to which breathing is induced by rhythmically reducing air pressure on the patient's abdomen and/or chest below atmospheric pressure, or alternatively, with a respirator of the type according to which breathing is induced by increasing the pressure rhythmically on the patient's abdomen above atmospheric pressure, the pump being provided with conveniently and effectively operable adjustable valve devices for controlling the air pressure for either type respirator.

Another object of the invention is the provision of an improved respirator pump adapted to supply positive air pressure to the patient's mouth cyclically in timed relation with the reduction of the air ressure in respirator apparatus of either of the above mentioned types.

A further object of the invention is to provide a respirator pump with improved driving mechanism for actuation of the pump by an operating motor.

Another object of the present invention is the provision of an artificial respirator pumping apparatus which is normally automatically operable and which has provision for manual operation during an emergency, wherein provision is made for facilitating release of the motor and associated mechanism from the pump actuation mechanism and for the operation connection to the latter of means for manually operating the pump.

Another object of the present invention is the provision of air pumping apparatus for rhythmically varying the air pressure in respirators of different types in the manner and under the conditions required in accordance with the functions and operational characteristic of said respirator devices, respectively.

Another object of respirator pumping apparatus having an improved control arrangement for providing positive pressure to the lungs of the patient.

Yet another object of the present invention is the provision of a generally improved compact readily portable lightweight and reliable respirator pump and which has improved control provisions disposed for ready accessibility for manipulation at a control panel.

The above and other objects, features and advantages of the present invention will be more fully understood from the following description considered in connection with the accompanying illustrative drawings.

Figure 1:
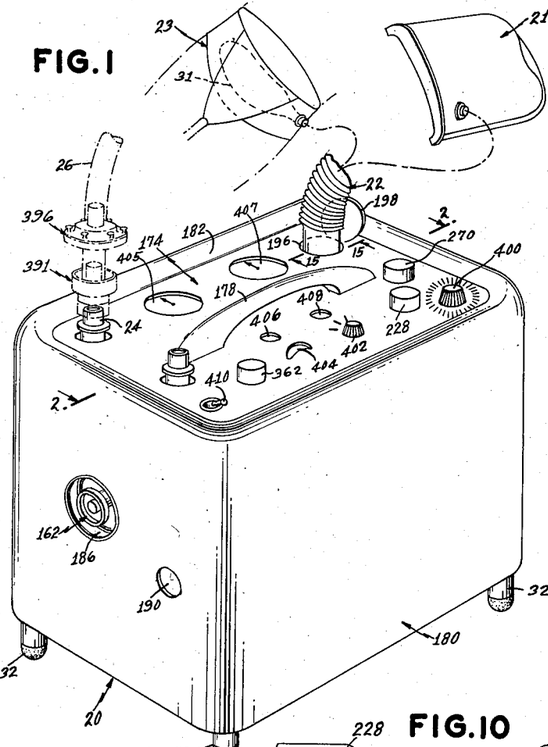
Fig. 1 is a perspective view of a respirator pumping apparatus pursuant to the present invention.

Referring to the drawings in detail, and more particularly to Fig. 1 thereof, thereof, there is illustrated a respirator pumping apparatus 20, pursuant to the present invention, which is adapted to supply different respirator devices singly, or in various combinations, with controlled fluid pressure in accordance with respective purposes of said devices. The respirator pump 20 is adapted to rhythmically vary the pressure of the air within a cuirass 21 in order to induce respiration when the cuirass is operatively associated with a patient and is connected to the pump by means of the conduit 22. Alternatively, the conduit 22 may be connected to an abdominal belt respirator 23 for the supply of fluid pressure thereto by means of the pump 20. In this connection, it will be noted that the pump 20 supplies both positive and negative pressures to the conduit 22, the belt respirator being operated by the positive pressure phase and the cuirass being operated by the negative pressure phase. The pump 20 is also adapted to supply positive pressure from the outlet or fitting 24 to the lung of the patient by means of the conduit 26 which may terminate in a suitable mouthpiece or in a suitable face mask, neither of which is illustrated.

The pump 20 is provided with a framework, generally designated by the reference numeral 28 (Figs. 2–5 and 13). Said framework comprises a base or bottom closure plate 30 which mounts four support legs 32. The base member 30 has the upwardly directed flanges 34 at the marginal edges thereof, the function of which will presently appear. Inwardly one of the marginal edges thereof, the base plate 30 mounts an angle member 36 to which is secured a vertically disposed support plate 38 secured to the angle member 36. A pair of laterally spaced vertically extending angle members 40—40 are suitably secured to the support plate 38. At the upper ends thereof, the angle members 40 are interconnected by an angle member or cross piece 42 which is suitably secured thereto. A horizontally disposed cylinder head plate 44 is secured, at one end thereof, to the cross member 42, as by securing elements 46, which also secure one end of a bracket 48 to an edge portion of the plate 44. The opposite end of the bracket is secured to an opposite edge portion of the plate 44, as by the securing elements 50. The base closure plate 30 also mounts a pair of laterally spaced angle members 52—52 to each of which there is secured a vertically extending angle member 54. A vertically extending guide plate 56 is secured to each angle member 54, the function of which will presently appear. In addition to the foregoing, the bottom closure plate 30 mounts a vertically extending tubular guide shaft 58, the bottom end of which is seated on a plug 60 suitably secured, as at 62, to the closure plate 30.

The pumping chamber or pump unit for the pump 20 is generally indicated by the reference numeral 64. Said pump unit comprises a cylinder 66 which is flanged at the upper end thereof, as at 68, said flange being secured to the previously described cylinder head plate 44, as by the securing elements 50. The previously mentioned tubular shaft 58 extends through an aperture 70 defined in the bottom 72 of the cylinder and through an enlarged aperture 74 defined in the cylinder head plate 44. The aperture 74 is enclosed by a housing 76 which is suitably secured to the plate 44, the upper end of guide 58 being fixed to the housing as by the mounting elements 80. A sleeve or tubular piston shaft 82, is mounted for vertical reciprocation on the guide 58, as hereinafter explained in detail. The sleeve 82 mounts the piston 84 within the cylinder 66, the piston being dished, as at 67, and provided with a suitable piston ring 86 which bears against the inner surface of the cylinder 66. A fixed bearing or bushing 88 is mounted within the aperture 70, the sleeve 82 extending through said bushing and provision is made for a movable bearing or bushing 90 for the sleeve at the upper end thereof. In addition to the bearing 90 at the upper end thereof, the piston shaft 82 also mounts a movable bearing 92.

Figure 3:
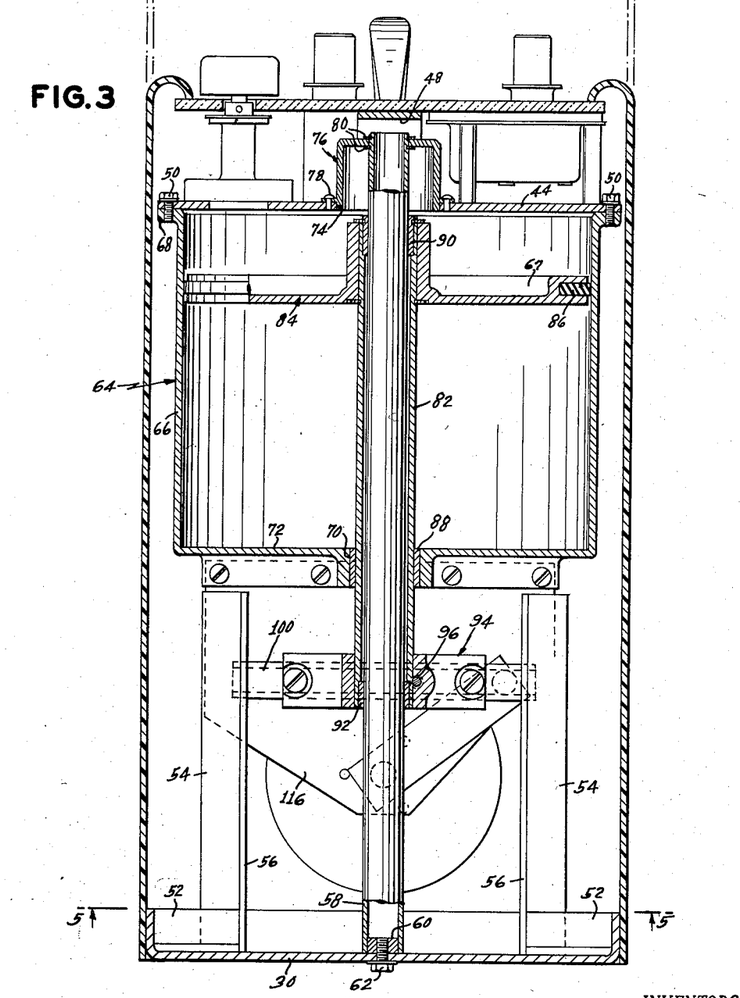
Fig. 3 is a sectional view taken on the line 3—3 of Fig. 2, the piston being illustrated displaced from the position thereof shown in Fig. 2, and portions being broken away for purposes of illustration.
Figure 5:
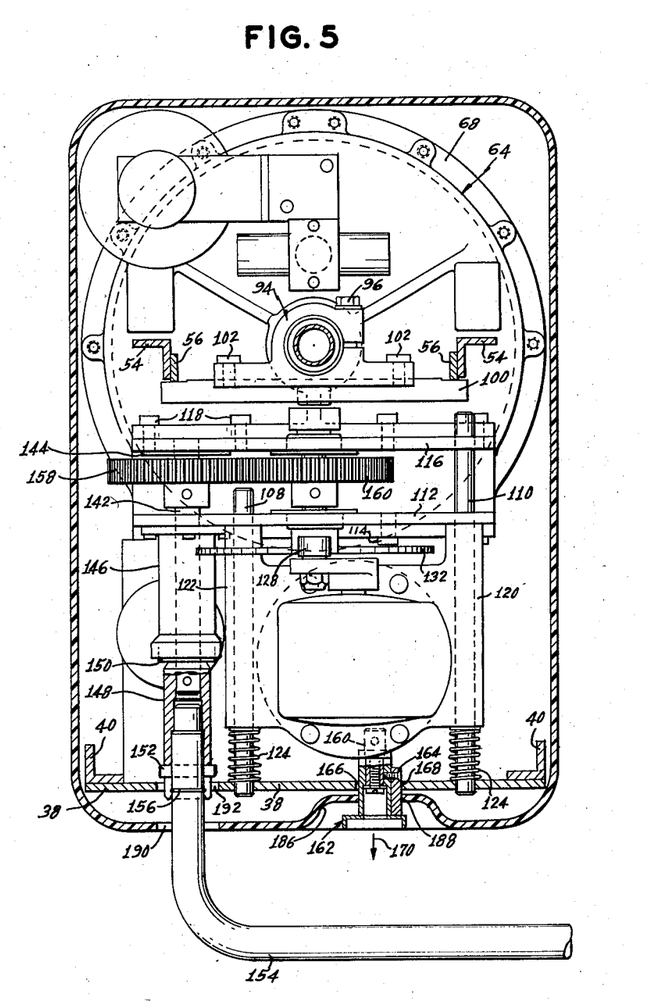
Fig. 5 is a sectional view taken on the line 5—5 of Fig. 3.

A collar or yoke 94 is mounted on the piston shaft 82, as by a clamping bolt 96. The yoke 94 is provided with a recess or seat 98 in which there is secured, as by the securing elements 102—102, a channel shaped horizontal guide member 100. Adjacent the opposite ends thereof, the guide member 100 abuts the previously mentioned guide plate 56—56, as best illustrated in Figs. 3 and 5, and is guided by the latter plate during the vertical reciprocation of said guide member, as hereinafter described in detail.

In order to effect said vertical reciprocation of the guide member 100 and the consequent reciprocation of the piston 84 within the cylinder 66, provision is made for a motor 104 which operates the drive mechanism, generally indicated by the reference numeral 106, through suitable reduction gearing in the gear case 107. The motor is mounted for bodily movement on a pair of rods 108 and 110. One end of each rod has bearing in the previously described plate 38. The other end of the rod 108 has bearing in a bearing plate 112 which is secured to the bottom of the casting which defines the cylinder 64, as by the securing elements 114. A second bearing plate 116 is similarly secured, as at 118, to the bottom of the cylinder 66, laterally of and parallel to the plate 112. The rod 110, at the other end thereof, has bearing support in both of the plates 112 and 116. The motor casing is provided with opposing lateral extensions 120 and 122 through which the rod 108 and 110, respectively, extend. A compression spring 124 is seated on each rod between the plate 38 and the associated casing extension so as to bias the motor 104 toward the plate 112 which serves as a detent therefor.

The previously mentioned drive 106 includes a drive crank arm 126 which is pinned to the shaft 140 operated through the reduction gearing of motor 104. The crank is provided with a roller 128 engaged in a radial slot 130 of a disc 132 keyed to one end of a shaft 134 journalled in the previously mentioned plates 112 and 116. A driven crank 136 is keyed to the other end of the shaft 134 and is provided with a roller 138 which rides in the channel shaped guide 100 for effecting the vertical reciprocation of the piston 84.

Figure 4:
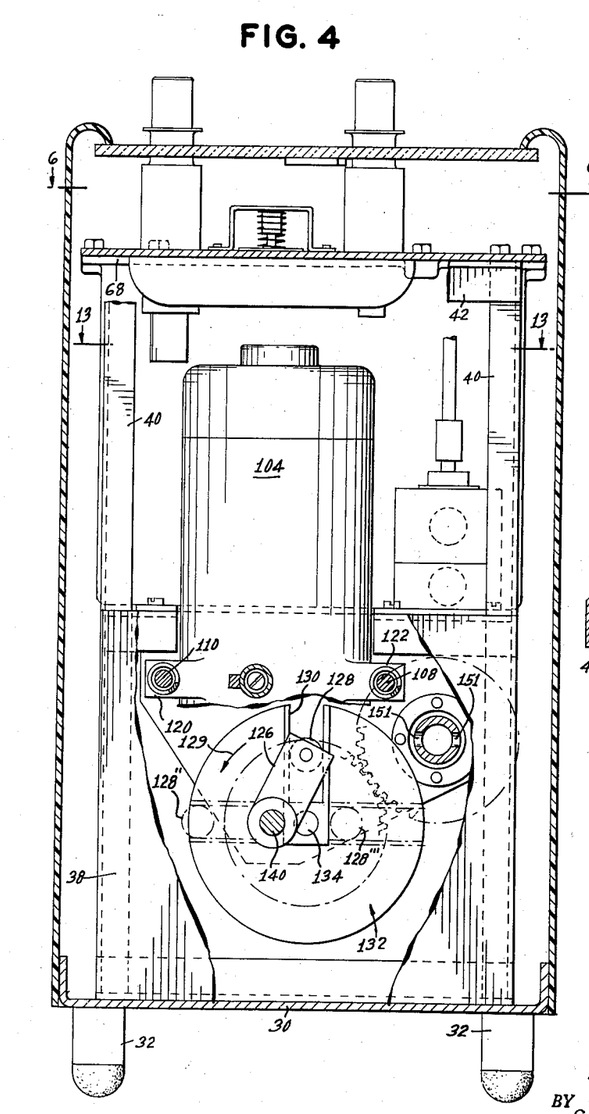
Fig. 4 is a sectional view taken on the line 4—4 of Fig. 2, with portions away for purposes of illustration.

As best illustrated in Fig. 4, the motor shaft 140, to which the drive crank 126 is secured, is disposed eccentrically of the shaft 134 to which the driven slotted member 132 is secured. Therefore, it will be apparent that the drive 106, which effects the vertical reciprocation of the piston 84, through the vertical reciprocation of the yoke 94 by the driven crank 136, will not operate the piston at a constant rate or speed. More specifically, it will be noted that, due to the eccentric relationship of the shafts 134 and 140, the distance between the roller 128 and the driven shaft 134, to which the disc or follower 132 is keyed, varies during each cycle of rotation of the disc from an intermediate distance, when the roller is at 128, to a maximum distance, when the roller is at 128″, to a minimum distance, when the roller is at 128‴, the disc rotating in the direction of the arrow 129. This causes the disc to rotate at different speeds during each cycle of operation thereof, said operation of the disc simulating the cyclical rate of a normal human breathing cycle. More specifically, during one half of each cycle of rotation thereof the disc rotates at a greater rate than during the remaining half of each cycle to correspond to the human breathing cycle wherein the rate of inhalation is greater than the rate of exhalation.

The foregoing cyclical operation of the disc 132 is transmitted through the shaft 134 to the crank arm 136 which duplicates the operating cycle of the disc. Said varying rate of rotary operation of the disc is converted into a corresponding varying rate rectilinear movement of the piston 84 by operation of the roller 138 in the guide 100 carried by the collar or yoke 94 which is mounted on the piston shaft 82, the latter being mounted for rectilinear movement on the fixed guide shaft 58.

Provision is made to operate the pump in the event of power failure which renders the motor 104 inoperative. In this connection, provision is made for a shaft 142 which is journalled in the plate 116, as by a suitable bearing 144, and extends through a bearing sleeve 146 which is suitably secured to the plate 112. The shaft 142 has a socket fitting 148 which is secured thereto, provision being made for a suitable bearing 150 within the sleeve 146 for the socket fitting 148. The socket fitting 148 extends through the previously mentioned plate 38 and is suitably slotted, as at 151 (Fig. 4), to receive a pin 152 provided on a hand crank 154, the latter being provided with a ring spring 156 to snap engage into the socket fitting 148. A gear 158, which is keyed to the shaft 142, meshes with a companion gear 160 which is keyed to the previously mentioned shaft 134.

It will be apparent that the rotation of the crank 154 will rotate the meshed gears 158 and 160, so as to rotate the shaft 134 for driving the crank arm 136 to effect the vertical reciprocation of the piston. In order to effect said manual operation of the pump by the hand crank 154, it is necessary to first disengage roller 128 of the drive crank 126 from the slot 130 of the driven member 132. In this connection, the casing of the motor 104 is provided with a projecting pin 160 (Fig. 5) on which there is suitably mounted a disconnect member 162 provided with a laterally projecting key 164. The disconnect member 162 extends through an opening 166 defined in the plate 38, said opening having a radial recess or slot 168 to accommodate the key 164 in the position thereof illustrated in Fig. 5. In said position the drive 106 is being operated by the motor 104 with the crank 126 engaged with the driven disc 132. In order to condition the apparatus for manual operation by the hand crank 154, the disconnect member 162 is withdrawn in the direction of the arrow 170 until the key 164 clears the slot 168. The disconnect member 162, which is rotatable relative to the pin 160, is then rotated sufficiently to move the key 164 out of alignment with the radial slot or recess 168, until the key 164 abuts the outer face or surface of the plate 38. The movement of the key 164 to disengage and clear the slot 168 is sufficient to move the motor 104, on the rods 108 and 110 against the bias of the springs 124, in the direction of the arrow 170 to withdraw the roller 128 from the slot in disc 132, and the engagement of the key with the outer face of the plate 38 retains the motor in the withdrawn position thereof against the bias of the springs. With the motor drive disengaged from the drive mechanism 106, the hand crank 154 is effective to operate the drive 106, as previously described, through the drive gear 158 and the driven gear 160. When it is desired to again operate the drive 106 by the motor 104, the disconnect 162 is rotated in the opposite direction to align the key 164 with the restricted slot 168, the compressed springs 124 expanding and moving the motor casing toward the plate 112, to engage the drive crank 126 with the driven member 132, the hand crank being utilized to rotate member 132 to engage crank roller 128 in slot 130.

Figure 2:
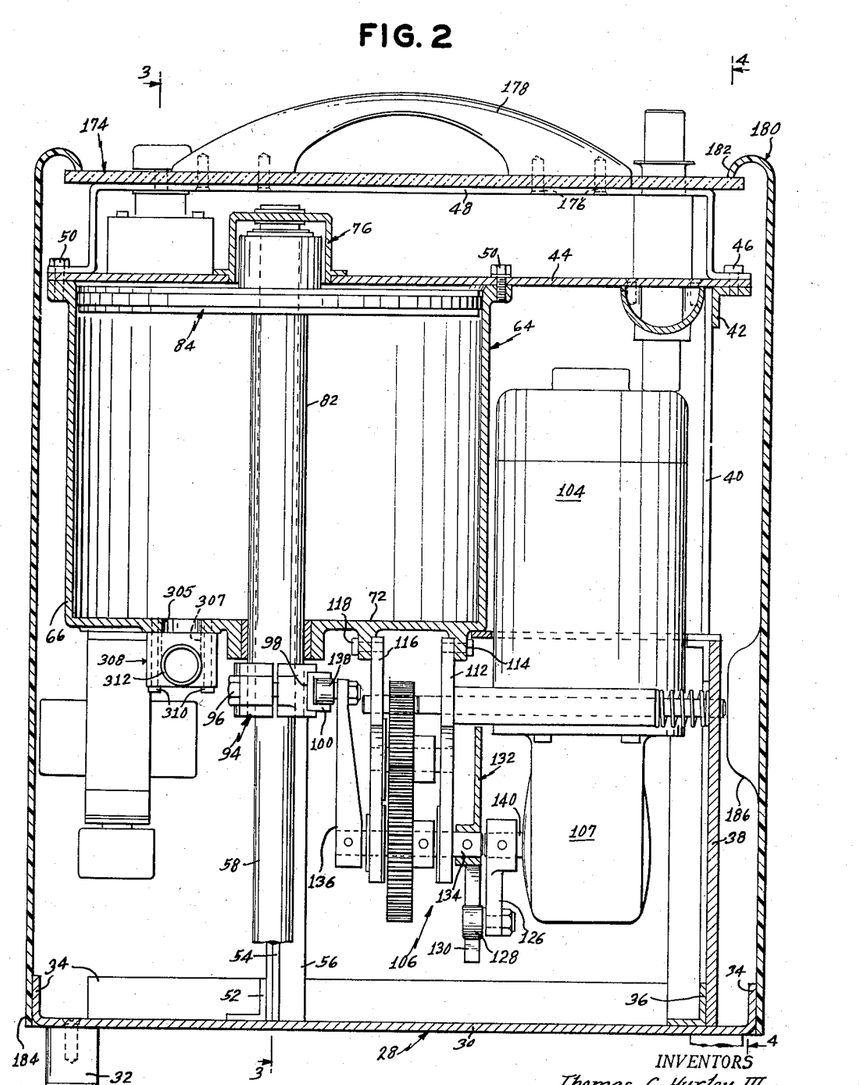
Fig. 2 is a sectional view on an enlarged scale, taken on the line 2—2 of Fig. 1.

Provision is made for an instrument panel 174 for the pump 20. As best shown in Fig. 2, the instrument panel 174 is suitably secured, as by the securing elements 176, to the previously mentioned bracket 48 secured to the cylinder head plate 44. The securing elements 176 also secure a handle 178 in position on the instrument panel 174. From the foregoing, it will be apparent that the pump 20 may be readily lifted by means of the handle 178 which is secured to the framework 28 through the bracket 48 and the cylinder head plate 44.

Provision is made for a suitable casing or housing 180 for the pump 20. Said casing is formed of a suitable material, preferably a plastic, and is open at both the top and bottom thereof, the top opening being provided with an inturned rim 182 which is adapted to abut the panel 174, the bottom end portion 184 being in overlying engagement with the upwardly directed flange 34 of closure plate 30, as best illustrated in Fig. 2. It will be noted that the handle 178, as well as the various controls and dials on the instrument panel, are readily accessible through the top opening of the casing 180, as best illustrated in Fig. 1. In addition provision is made in said casing for a surface depression 186 provided with an opening 188 to accommodate the motor disconnect 162. The casing is also provided with an aperture 190 to accommodate the hand crank 154, the plate 38 being provided with an opening 192 in alignment with opening 190 to accommodate access to the socket 148. The casing may be readily removed from the pump 20, after removal of disconnect 162 from pin 60, by moving the casing upwardly from the pump, as indicated in broken line in Fig. 3, the casing being readily mountable on the pump by movement in the opposite direction.

Figure 15:
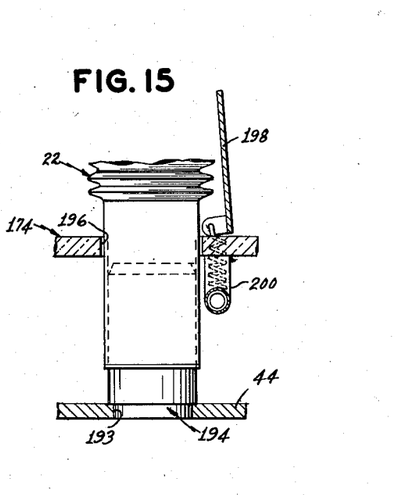
Fig. 15 is a fragmentary sectional view, on an enlarged scale, taken on the line 15—15 of Fig. 1.

As best shown in Fig. 15, the cylinder plate 44 is provided with an aperture 193 in which there is provided a fitting 194 for the previously mentioned hose 22 which can be connected alternatively either to the cuirass 21 or the belt 23, the conduit being insertable through an opening 196 provided in the panel 174. When the conduit 22 is withdrawn from the pump, the opening 196 is closed by a cover 198 provided with a suitable spring hinge 200.

The pump 20 is provided with a positive pressure adjustment valve 202 and with a negative pressure adjustment valve 204 (Fig. 10) for controlling both the positive and negative pressure build ups, respectively, in the pump for operation of the cuirass or belt through the conduit 22. The manually operable positive pressure adjustment valve 202 overlies a port 206 of the cylinder defined in the cylinder head plate 44. The valve 202 comprises a valve casing 208 which is suitably secured to the cylinder plate, as at 210, and is provided with a plurality of vents 212. The valve casing has a stem portion 214, in which there is threadedly engaged a part 216 which is provided at the bottom thereof with a spring seat 218. A shaft 220 is slidable in the part 216, said shaft mounting a valve disc 222, a compression spring 224 being interposed between the disc and the seat 218 to close the valve. A valve operating shaft 226, provided with a control knob 228, is rotatable in the stem 214 and is suitably secured to the part 216 for rotating the latter to vary the compression of the spring. It will be noted that the knob 228 is accessible at the front or outer surface of the panel 174. It will be apparent that when the piston 84 moves toward the cylinder head plate 44, there is a positive pressure build up within the cylinder 64 which is applied to the valve disc 222 through the port 206, the extent by which the disc moves away from the port 206 being determined by the compression of the spring 224. Consequently, it will be apparent that the setting of the part 216 to adjust the compression of the spring 224 will control the amount of positive pressure which escapes through the port 206 into the valve 208 and through the vents 212 thereof, so as to control the positive pressure applied through the conduit 22 to the belt 23 when the latter is connected to the conduit. When the belt respirator 23 is operatively connected to the pump unit 20 by means of the conduit 22, the inflatable bladder 31 of said respirator will be in fluid communication with the port 193 of said pump unit. The bladder 31 is adapted to be rhythmically inflated and deflated for inducing respiration in the manner fully illustrated and described in the United States Patent No. 2,762,366.

The negative pressure adjustment valve 204 is provided with a valve housing 230 which is suitably secured, as at 232, to the cylinder head plate 44, at a port 234 of the cylinder, defined therein. The casing 230 defines a valve chamber 236 which is vented to the ambient atmosphere by the vent 238. Provision is made for a guide disc 248 which is secured by the elements 232 over the port 234 and which is provided with the apertures 250. The disc 248 is also provided with apertures 252 for guide elements 254 provided on a spring seat 256 secured to a shaft 258 which slidably mounts a sleeve 264 provided with the apertures 250. The disc 248 is also provided with apertures 252 for guide elements 254 provided on a spring seat 256 secured to a shaft 258 which slidably mounts a sleeve 264 provided with a valve disc 260 which controls the flow of atmospheric pressure through the port 234 into the cylinder. A compression spring 262 is disposed between the seat 256 and the disc 260 to close the valve. The upper end of the shaft 258 is threadedly in a member 266 which is secured to the operating shaft 268 provided with the control knobs 270. Member 266 is rotatable in the housing 230 but is retained against vertical movement therein. It will be understood that the rotation of the control knob 270 and the consequent rotation of the part 266, effects the vertical movement of the shaft 258 for moving the spring seat 256 relative to the disc 260 whereby to vary the compression of the spring 262.

Figure 10:
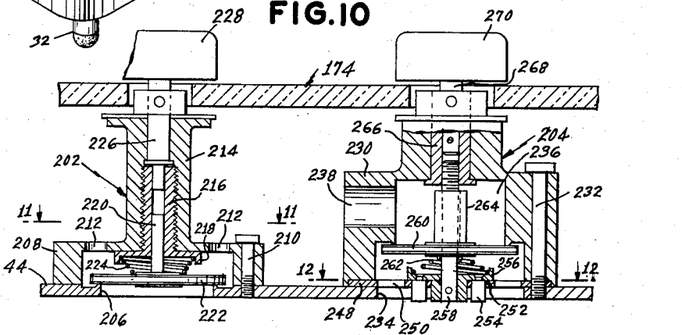
Fig. 10 is a fragmentary sectional view, on an enlarged scale, taken on the line 10—10 of Fig. 6.
Figure 11:
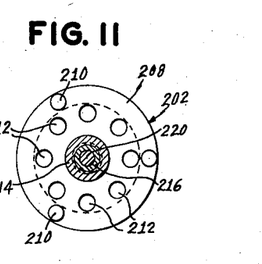
Fig. 11 is a sectional view taken on the line 11—11 of Fig. 10.
Figure 12:
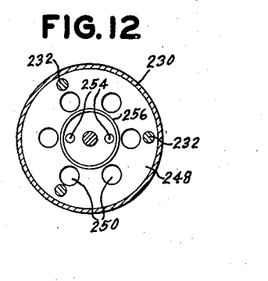
Fig. 12 is a sectional view taken on the line 12—12 of Fig. 10.

Upon movement of the piston downwardly from the piston head plate 44 so as to provide a negative pressure build up in the pump, the disc 260 will be moved, by atmospheric air pressure out of the closing position thereof illustrated in Fig. 10, toward the port 234 so as to introduce air from the ambient atmosphere into the cylinder 64. The extent or degree of compression of the spring 262 will determine the extent of movement of the disc 260 away from the closed position thereof and thereby regulate the amount of negative pressure build up in the cylinder 64 which is transmitted through the conduit 22.

As previously indicated, either a belt respirator device 23 or a cuirass respirator device 21 may be connected alternatively, to the conduit 22, the belt respirator operating on the positive pressure phase of the movement of the piston relative to the cylinder head plate and the cuirass operating on the negative pressure phase thereof, valve 202 being adjusted to provide the proper positive pressure build up for the belt and valve 204 being adjusted to provide the proper negative pressure build up for the cuirass. The cuirass may be any one of the well known types, but is preferably of the type and constitution shown and described in the patent to Thomas C. Huxley III, No. 2,466,108, issued April 5, 1949. The pump unit 20 when operatively associated with the cuirass alternates between partial evacuation and normal atmospheric pressure of the air within the cuirass to induce normal respiration.

The pump is provided with a negative pressure relief valve 272 (Figs. 6 and 8) which is adapted to vent said pump to the atmosphere on the build-up of excessive negative pressure. The cylinder head plate 44 of the pump is provided, within the cylinder, with a port 274 and the valve 272 is provided with a valve disc 276 which normally closes said port and which is adapted to open the latter to the atmosphere on the creation of excess negative pressure in the cylinder 64. A bearing strap 278 for the valve is suitably secured to the cylinder head 44, by means of bolts 280, and said strap is provided with a suitable bearing 282 for the valve stem 284. A compression spring 286 is disposed on the stem 284 and extends between the bearing strap 278 and the washer 288, the stem having nuts 290 threaded on the end thereof to maintain the valve 272 in assembled relation. It will be understood that the spring tension will be controlled by the nuts 290 and that the spring tension will be preset to permit the valve member 272 to open under predetermined conditions to prevent excessive negative pressure build up in the cylinder.

Figure 6:
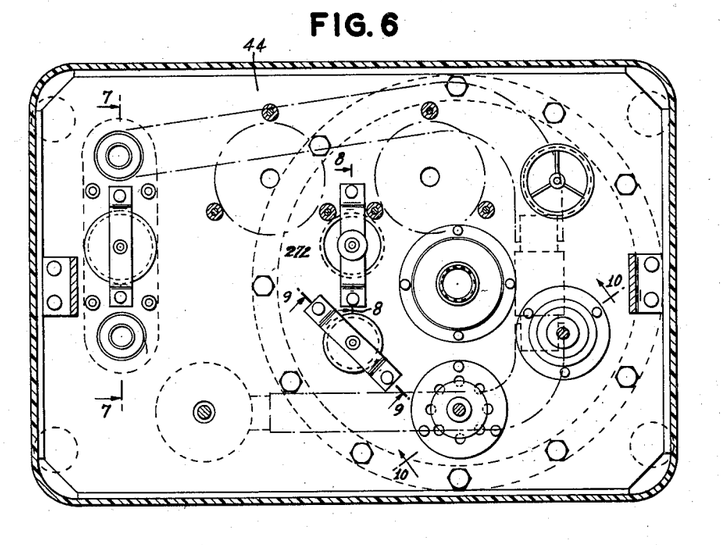
Fig. 6 is a sectional view taken on the line 6—6 of Fig. 4.
Figures 7, 8:
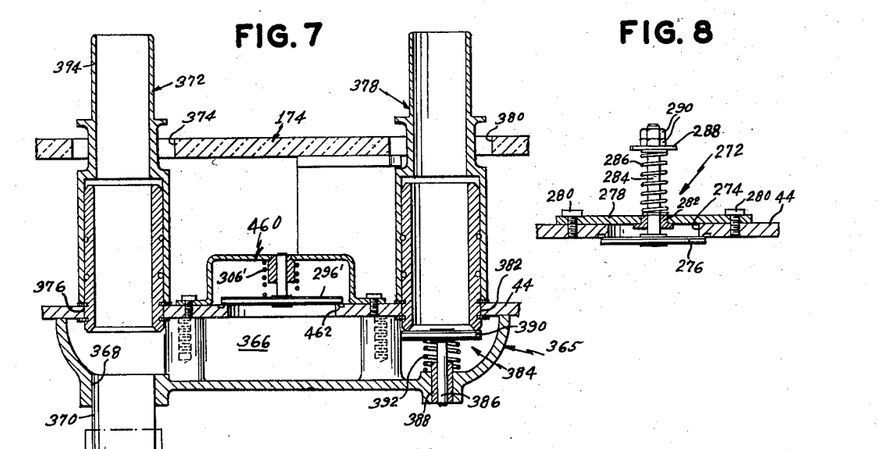
Fig. 7 is a fragmentary sectional view, on an enlarged scale, taken on the line 7—7 of Fig. 6.
Fig. 8 is a fragmentary sectional view, on an enlarged scale, taken on the line 8—8 of Fig. 6.
Figure 9:
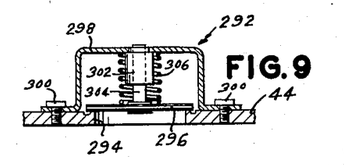
Fig. 9 is a fragmentary sectional view, on an enlarged scale, taken on the line 9—9 of Fig. 6.

The pump 20 is also provided with a positive pressure relief valve 292 (Figs. 6 and 9). The cylinder head 44 is provided with a vent port 294, within the cylinder, and the valve 292 includes a valve disc 296 which normally closes said port and which opens said port to atmosphere under excess positive pressure conditions in the cylinder. The valve includes a U-shaped bearing part 298 which is suitably secured to the cylinder head 44 by means of the bolts 300, and said part mounts bearing sleeve 302 for the valve stem 304, the latter carrying the valve disc 296. A compression spring 306 surrounds the shaft and sleeve bearing 302 and extends between the valve member 296 and the part 298, the spring tension being predetermined so as to open the port 294 under preselected excess positive pressure conditions in the cylinder.

Figure 13:
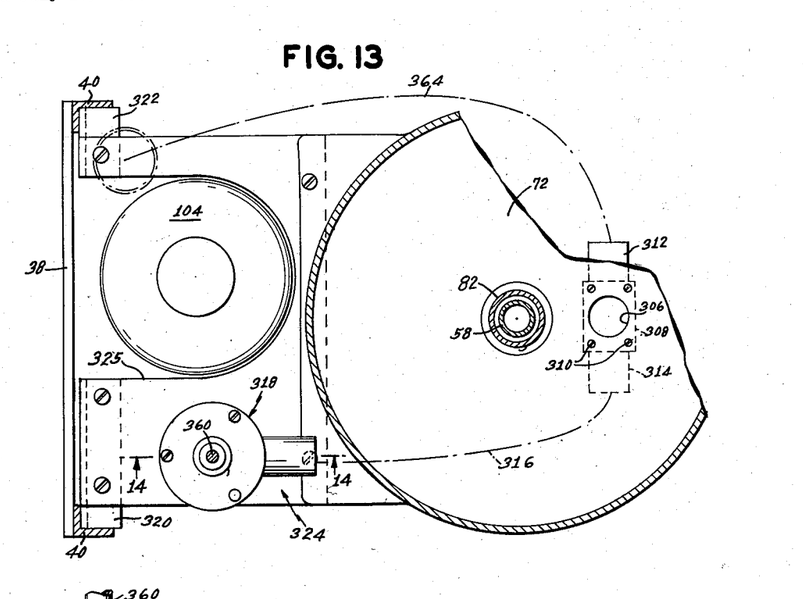
Fig. 13 is a fragmentary sectional view, with parts omitted, taken on the line 13—13 of Fig. 4.
Figure 14:
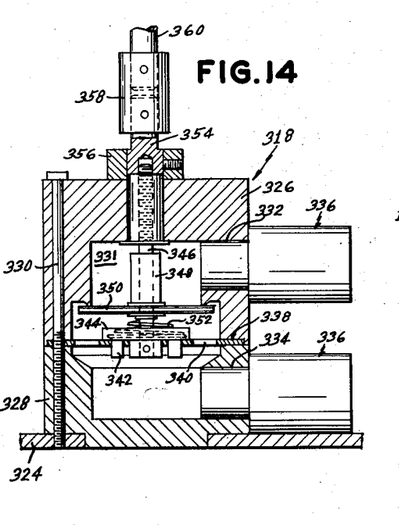
Fig. 14 is a fragmentary sectional view, on an enlarged scale, taken on the line 14—14 of Fig. 13.

At the bottom thereof, the cylinder 64 is provided with a port 305 (Fig. 2) which is in fluid communication with a T-fitting 308, which is suitably secured to the cylinder as by the bolts 310. The T-fitting 308 is provided with a central passageway 307 which communicates with the port 305 and with a pair of oppositely extending passageways or branches 312 and 314. The passageway 314 of the T-connection 308 is connected, as by a conduit 316 (Figs. 6 and 13) to a positive pressure adjustment valve 318 (Figs. 6, 13 and 14). In order to mount said valve 318, angle members 320 and 322 are suitably secured to the previously mentioned members 40, as best shown in Figs. 2, 4 and 13 and a mounting plate 324 is suitably secured to said angle members. The plate is provided with a cut-out 325 to accommodate the motor 104. The valve 318 is substantially similar in construction to the previously described negative pressure adjustment valve 204, except as hereinafter described. The valve 318 is provided with the valve parts 326 and 328 which define the valve housing, said elements being secured together and to the mounting plate 324, as by the bolts 330. The valve housing defines a valve chamber 331 which is provided with an inlet port 332 and an outlet port 334, to each of which there is suitably secured an adaptor 336. The adaptor 336 associated with the inlet 332 receives one end of the previously mentioned conduit 316, the other end of which is received by the branch 314 of the T-fitting 308, so that the valve chamber 331 is in fluid communication with the bottom of the cylinder 64 through the T-connection. The adaptor 336 associated with the outlet 334 is open to the ambient atmosphere. A guide member 338, provided with the air passages 340, is suitably secured in position between the housing parts 326 and 328, said member being provided with guide openings for the pins 342 provided on a spring seat 344 which is secured to one end of a shaft 346. The shaft extends through a sleeve bearing 348 which is slidable thereon and which mounts a valve disc 350, a compression spring 352 being interposed between the seat 344 and the disc 350. The shaft is threaded into a part 354, which is secured against vertical movement relative to the valve housing but which is rotatable therein. A collar 356 retains the part 354 in position on the valve housing. The part 354 is coupled by the coupling element 358 to a control shaft 360 which extends through the panel and is provided with a knob 362. From the foregoing, it will be apparent that upon a positive pressure build-up in the cylinder 64 below the piston 84, the positive air pressure will be applied through the conduit 316 to the inlet 332 of the valve assembly 318 so as to force the disc 350 against the bias of the spring 352 whereby to relieve the positive pressure build-up through the outlet 334. By rotating the control shaft 360 a predetermined compression or stress may be applied to the spring 352 so as to predetermine the amount of positive pressure build up at the bottom of the cylinder which is applied to the mouthpiece or face mask, as hereinafter described.

The other passageway 312 of the T-connection 308, which is in communication with the interior of the cylinder 64, at the bottom thereof, is connected by means of the conduit 364 to an elongated chamber defining member 365 which is suitably secured to the head plate 44 of the cylinder, and which defines the chamber 366 therewith. The member 365 is provided with an inlet 368 to said chamber in which there is provided a suitable fitting 370 for receiving the conduit 364. A suitable connector 372 extends through an opening 374 in the panel 174 and through an opening 376 in the plate 44 into the chamber 366. At the other end thereof, a second connector 378, which is similar to the conector 372, extends through an opening 380 in the panel 174 and through an opening 382 in the cylinder plate 44 so as to communicate with the chamber 366. A positive pressure device or valve 384 is mounted by the member 365 below the connector 378 so as to normally close the latter. In this connection, it will be noted that the valve 384 is provided with a valve stem 386 mounted in a bearing 388, the valve stem mounting a valve disc 390 and the latter being urged by a compression spring 392 against the bottom of the connector 378 so as to close the latter. The outer end of the connector 378 may be readily connected to a conduit which may supply oxygen or any other desired fluid, such treated fluid, to the pump chamber for supply to the patient, or may be used as an air inlet. Accordingly, oxygen or an aerosol fluid may be supplied through the chamber 366 to the cylinder through the branch 312 of the T-connection 308 during the negative phase of the pumping cycle below the piston 84 for supply to the patient through the connector 372, during the positive pressure phase of said cycle.

Figure 16:
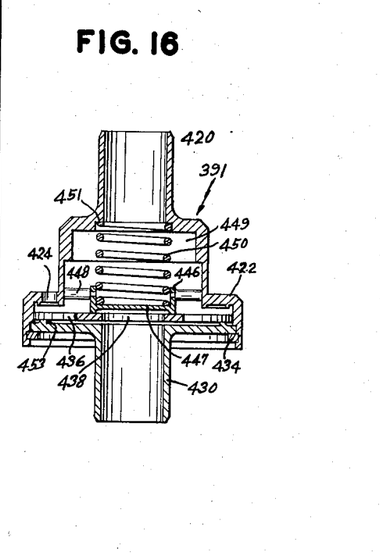
Fig. 16 is a vertical sectional view of a positive pressure device.

It will be understood that during the negative pressure cycle, between the piston 84 and the bottom of the cylinder 64, the disc 390 is unseated from the inner end of the connector 378 to admit such treating fluid for oxygen to the cylinder 64. Said valve 384 operates to prevent such oxygen or other fluid from being released through the connector 378, during the positive pressure phase between the piston 84 and the bottom of the cylinder, by closing against the bottom of the connector 378 during said positive pressure phase to allow the oxygen or other fluid to pass under pressure through the connector 372 into the previously mentioned conduit 26 for supply to the mouthpiece or face mask provided on a patient. In this connection, provision is made for a suitable positive pressure device or valve 391 (Figs. 1 and 16) which is interposed between the outer end 394 of the connector 372 and the conduit 26 with a suitable filter 396 interposed between the positive pressure device and the conduit. Said valve is provided with an outlet fitting 420 for connection to the conduit 26, or to the filter 396, where the latter is used, said conduit supplying cyclical positive pressure directly to the lungs of a patient in a manner which will be apparent in the description which follows. It will also be apparent that the oxygen or treated air admitted to the pumping chamber or cylinder will be supplied to the patient by the positive pressure device 391. Said device comprises a housing 422 having a series of apertures 424 which are open to the atmosphere, said housing having a fitting 430 secured therein by means of the retainer ring 434. Disposed in the housing is a disc type valve member 436 which is centrally apertured, as at 438, said valve member being operatively associated with the valve member 446 which is provided with a plurality of peripheral radial extending pins 448 which define air passages therebetween and which guide the member 446 for movement within the housing 422, said air passages communicating with the internal chamber 449 of the housing. The valve part 446 defines a cup 447 which has one end of the spring 450 seated therein, the opposite end of said spring being seated against the peripheral shoulder 451 of the housing 422. Thus the compression spring 450 biases the valve member 446 into engagement with the valve member 436 so as to bias the latter into engagement with its valve seat 453. The valve members 436 and 446 are shown in Fig. 16 in their position on the negative pressure phase of the pumping cycle, below the piston, and on this phase of the pumping cycle the conduit 26 will be vented to the atmosphere through the vents defined by the pins 448 and the vents 424. In said negative presure phase of the pumping cycle, the valve members 446 and 436 will thus close the aperture 438 and the patient will readily exhale through the conduit 26 which will communicate with the atmosphere through the open vents defined by the pins 448 and the open vents 424. During the positive pressure phase of the pumping cycle, the valve members 436 and 446 will be unseated from each other and from the valve seat 453 so as to place the conduit 26 in fluid communication with the fitting 394, said communication being effected through the valve aperture 438 and the vents defined by the pins 448, it being noted that the vents 424 will be closed by the valve member 436 under positive pressure conditions. Accordingly, under positive pressure conditions the valve member 436 will be pressure urged so as to close the vents 424 with the valve member 446 being disposed from engagement with the valve member 436 so that fluid may pass therebetween and through the vents defined by the pins 448 into the conduit 26. Thus the positive pressure device 392 supplies cyclical pressure directly to the lungs of a patient through either a mouthpiece or face mask, and as noted above, the fluid under positive pressure may be oxygen or suitably treated air.

It will be noted that during downward movement of the piston to supply positive pressure directly to the lungs of a patient, negative pressure is being simultaneously supplied through conduit 22 to the cuirass 21, if the latter is connected thereto, to cause the patient to inhale, or if the belt 23 is connected to the conduit 22, the belt bladder 31 is deflating to atmospheric pressure to cause the patient to inhale.

The chamber 366 is also provided with a positive pressure relief valve 460 which is similar to the previously described positive pressure relief valve 292. Valve 460 operates in the same manner as valve 292 to unseat the valve disc 296' thereof, from a port 462 in head plate 44, against the bias of spring 306' under preselected excess positive pressure conditions in the chamber 366 so that excess positive pressure will not be supplied directly to the patient's lungs through conduit 26.

To complete the description of the apparatus, the motor 104 is a direct-current motor and is energized by an A. C. source through a step-down transformer and a suitable rectifier (not illustrated) provision also being made for emergency operation of the motor by batteries. The panel includes a rate adjustment 400 for controlling the speed of operation. Said rate adjustment is constituted by a rheostat arrangement which is generally indicated at 402 and 404, in Fig. 1 and which is interposed in the direct-current lines between the rectifier (not illustrated) and the motor 104, so as to control the speed of operation of the motor by controlling the D. C. supply thereto. The rheostat arrangement also includes a step rheostat inserted in the direct current line and which is controlled by the voltage adjustment knob 402 on the panel to adjust the rheostat to compensate for fluctuations in the alternating current input so as to provide a constant direct current supply for the motor. Reference numeral 404 on the panel indicates a volt meter, the reference numerals 406 and 408 indicating pilot lights which are energized under normal and emergency operation, respectively. A positive pressure gauge 405 indicates the positive pressure being supplied to the mask or mouthpiece through the conduit 26 and a gauge 407 indicates the pressure supplied to the cuirass or belt through the conduit 22. An on-off power switch is indicated at 410. The pilot light 406 indicates operation from the A. C. power source and the pilot light 408 indicates battery operation. It will be apparent that the adjustment of the control 400 is used to vary or regulate the rate of rise and fall of pressure within the cylinder, so that the pattern of the respiratory cycle may be varied in accordance with the patient's requirement.

The aforedescribed apparatus may supply intermittent or cyclic pressure to a cuirass, or alternatively, intermittent positive and negative pressure to an abdominal belt respirator, and intermittent positive pressure directly to the lungs through the mouth or nose. The pump can be used simultaneously on two patients, one using an abdominal respirator with the other having positive pressure directly fed to the lungs. When the pump is used for providing negative pressure in the cuirass, it is also possible to supply a pressure slightly higher than atmospheric pressure to the cuirass during one cycle of operation of the pump, the valve means being suitably adjusted to accomplish this result. Also when the cuirass is disconnected from the pump and the belt type of respirator is connected thereto, the valve means may be adjusted so that the suction stroke of the pump in relation to the belt may result in the provision in the belt of a pressure which may be atmospheric pressure or a pressure less than the atmospheric. Further it will be understood that positive pressure may be supplied to the lungs while negative pressure is being provided in the cuirass, when the pump is connected thereto, and that positive pressure may be supplied to the lungs while the pump is connected to the belt respirator and the piston is on its suction stroke to provide either atmospheric or slightly sub-atmospheric pressure in the belt.

While we have shown and described the preferred embodiments of our invention, it will be understood that various changes may be made in the idea or principles of the invention within the scope of the appended claims.

Having thus described our invention, what we claim and desire to secure by Letters Patent, is:

1. In a respirator pump for rhythmically varying fluid pressure in a device for inducing breathing, an expansible and contractible air chamber adapted to be connected to a respirator device in fluid-flow relation thereto, drive means for cyclically expanding and contracting said chamber for inducing a rhythmic flow of air to and from said chamber, said drive means having provision for the releasable connection of a hand crank thereto for manual operation of said pump and a motor having an operative connection with said drive means for automatic operation of said pump, said motor being mounted for bodily movement relative to said drive means, whereby to release said operative connection of said motor and said drive means for manual operation of said pump, said drive means including first shaft means mounting a driven member, a drive member mounted by said motor and in normal driving engagement with said driven member, a driven gear keyed to said shaft means, a drive gear in mesh with said driven gear, second shaft means including said releasable connection provision for the hand crank and mounting said drive gear, and said motor being movable to disengage said drive member from said driven member, whereby the hand crank is effective to operate said drive gear for operating said pump.

2. In a respirator pump having a cylinder and a reciprocating piston, means for actuating said piston at different speeds during the compression and suction strokes thereof, respectively, comprising a rotary driving member, a rotary driven member, said driving and driven members being mounted for rotation about parallel axes disposed in spaced relation, said driven member having a radial slot, an arm on said driving member engageable in said slot for rotating said driven member, and means operatively connecting said driven member to said piston for reciprocating the latter in said cylinder.

3. In a respirator pump having a cylinder and a reciprocating piston, means for actuating said piston at different speeds during the compression and suction strokes thereof, respectively, comprising a rotary driving member, a rotary driven member, said driving and driven members being mounted for rotation about parallel axes disposed in spaced relation, said driven member having a radial slot, an arm on said driving member engageable in said slot for rotating said driven member, a cross member having a slot, fixed to said piston, and an arm operatively connected to said driven member and engageable in said cross member slot for reciprocating said piston in the cylinder.

4. In a respirator pump for rhythmically varying fluid pressure in a device for inducing breathing, a cylinder adapted to be connected to a respirator device in fluid flow relation therewith, a piston movable in said cylinder for establishing air flow into and out of the respirator device for inducing breathing, and means to operate said piston at an irregular rate of movement so that the rate of its negative stroke exceeds the rate of its positive stroke, whereby the rate of said air flow into and out of the cylinder will simulate a normal human breathing cycle, said operating means comprising a rotary driving member, a rotary driven member having a radial slot and mounted for rotation in eccentric parallel relation with said driving member, an arm on said driving member engageable in said slot for rotating said driven member, and means operatively connecting said driven member to said piston for reciprocating the latter in said cylinder.

5. In a respirator pump having a reciprocating piston and a cylinder with a port defined therein at one side thereof for connection to a respirator device, means for actuating said piston at different speeds during the compression and suction strokes thereof, respectively, comprising a rotary driving member, a rotary driven member, said driving and driven members being mounted for rotation about parallel axes disposed in spaced relation, said driven member having a radial slot, an arm on said driving member engageable in said slot for rotating said driven member, means operatively connecting said driven member to said piston for reciprocating the latter in said cylinder, and means for separately adjusting the positive and negative air pressures available at said port, whereby a positive pressure operable respirator device or a negative pressure operable respirator device may be connected to said port.

6. In a respirator pump for rhythmically varying pressure in a device for inducing breathing, a cylinder provided with a piston movable therein, means for actuating said piston at different speeds during the compression and suction strokes, thereof, respectively, comprising a rotary driving member, a rotary driven member, said driving and driven members being mounted for rotation about parallel axes disposed in spaced relation, said driven member having a radial slot, an arm on said driving member engageable in said slot for rotating said driven member, and means operatively connecting said driven member to said piston for reciprocating the latter in said cylinder, said cylinder having ports defined therein at opposite sides thereof for connection to respirator devices whereby movement of said piston in one direction simultaneously establishes air flow out of one of said ports and air flow into the other of said ports and corresponding simultaneous air flows to and from the respirator devices connected to said ports, respectively, means for separately adjusting the positive and negative air pressures available at each of said ports, whereby positive air pressure may be supplied directly to the patient's lungs from said other port during the reduction of the air pressure in a respirator device connected to said one port.

References Cited in the file of this patent

UNITED STATES PATENTS

| | | |
|---|---|---|
| 2,270,313 | Kraft | Jan. 20, 1942 |
| 2,581,893 | Wilm | Jan. 8, 1952 |

FOREIGN PATENTS

| | | |
|---|---|---|
| 848,920 | France | Aug. 7, 1939 |